(12) United States Patent
Walter

(10) Patent No.: US 10,295,030 B2
(45) Date of Patent: May 21, 2019

(54) CVT TRANSMISSION

(71) Applicant: Schaeffler Technologies AG & Co. KG, Herzogenaurach (DE)

(72) Inventor: Bernhard Walter, Oberkirch-Haslach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 296 days.

(21) Appl. No.: 15/101,909

(22) PCT Filed: Nov. 28, 2014

(86) PCT No.: PCT/DE2014/200664
§ 371 (c)(1),
(2) Date: Jun. 4, 2016

(87) PCT Pub. No.: WO2015/086018
PCT Pub. Date: Jun. 18, 2015

(65) Prior Publication Data
US 2016/0305520 A1    Oct. 20, 2016

(30) Foreign Application Priority Data

Dec. 9, 2013    (DE) .................. 10 2013 225 231

(51) Int. Cl.
*F16H 37/02* (2006.01)
*F16H 61/662* (2006.01)
(Continued)

(52) U.S. Cl.
CPC ......... *F16H 37/022* (2013.01); *F16H 37/082* (2013.01); *F16H 61/662* (2013.01);
(Continued)

(58) Field of Classification Search
CPC ..................................... F16H 37/022
See application file for complete search history.

(56) References Cited

U.S. PATENT DOCUMENTS

| 3,442,346 A | 5/1969 | Winter et al. |
| 4,736,652 A | 4/1988 | Shimamoto |
(Continued)

FOREIGN PATENT DOCUMENTS

| CN | 1945062 A | 4/2007 |
| CN | 102128211 A | 7/2011 |
(Continued)

OTHER PUBLICATIONS

Ohinese Office Action for Chinese Application No. CN 201480066798.8, dated Feb. 11, 2018, 7 Pages.
(Continued)

*Primary Examiner* — Derek D Knight
(74) *Attorney, Agent, or Firm* — Kevin L. Parks

(57) ABSTRACT

A CVT transmission having an input drive, a continuously variable variator, a sub-transmission to achieve at least two operating ranges (low and high) each with continuously variable gear ratios, and having a direct-shift stage for switching between a first operating range (low) and a second operating range (high) with continuously variable gear ratios. For the first operating range (low) the sub-transmission includes a non-positive clutch, such as a friction clutch, and for the second operating range (high) it includes a positive clutch, such s a jaw clutch.

11 Claims, 2 Drawing Sheets

(51) Int. Cl.
*F16H 37/08* (2006.01)
*F16H 3/14* (2006.01)
*F16H 3/54* (2006.01)

(52) U.S. Cl.
CPC .................. *F16H 3/14* (2013.01); *F16H 3/54* (2013.01); *F16H 2037/026* (2013.01); *F16H 2200/0034* (2013.01); *F16H 2200/2005* (2013.01); *F16H 2200/2064* (2013.01); *F16H 2200/2094* (2013.01)

(56) References Cited

U.S. PATENT DOCUMENTS

| | | | |
|---|---|---|---|
| 4,950,208 | A | 8/1990 | Tomlinson |
| 5,788,600 | A | 8/1998 | Tsukamoto et al. |
| 7,517,299 | B2 | 4/2009 | Eguchi et al. |
| 8,257,216 | B2 * | 9/2012 | Hoffman ............... F16H 37/086 475/207 |
| 2012/0143448 | A1 * | 6/2012 | Tohyama ............... F16H 61/12 701/51 |

FOREIGN PATENT DOCUMENTS

| | | |
|---|---|---|
| CN | 102128244 A | 7/2011 |
| DE | 36 21 089 A1 | 1/1987 |
| DE | 102 61 990 A1 | 2/2004 |
| DE | 10 2012 204 470 A1 | 10/2012 |
| EP | 2 275 709 A1 | 1/2011 |
| JP | S5937361 A | 2/1984 |
| JP | S5980554 A | 5/1984 |
| JP | S63258235 A | 10/1988 |
| JP | 2010138961 A | 6/2010 |

OTHER PUBLICATIONS

Ohinese Search Report for Chinese Application No. CN 2014800667988, dated Mar. 6, 2017, 2 Pages.
International Search Report issued for PCT/DE2014/200664.
Written Opinion of the International Searching Authority, issued for PCT/DE2014/200664.
Chinese Office Action dated Mar. 14, 2017, in Chinese application No. 2014800679.8 corresponding with PCT/DE2014/200664.
English-language translation of Abstract of Chinese published application No. CN102128211A.

* cited by examiner

CVT TRANSMISSION

CROSS-REFERENCE TO RELATED APPLICATION

This application is the U.S. national phase application under 35 U.S.C. § 371 of International Application Serial No. PCT/DE2014/200663, having an international filing date of 28 Nov. 2014, and designating the United States, which claims priority based upon German Patent Application No. DE 10 2013 225 227.7, filed on 9 Dec. 2013, the entire contents of each of which applications are hereby incorporated by reference herein to the same extent as if fully rewritten.

BACKGROUND OF THE INVENTION

Field of the Invention

The present invention relates to a CVT transmission having an input drive, a continuously variable variator, a sub-transmission to achieve at least two operating ranges (low and high) with continuously variable gear ratios, and having a direct-shift stage for switching between a first operating range (low) and a second operating range (high) with continuously variable gear ratios. In addition, the present invention relates to a method for operating such a CVT transmission.

Description of the Related Art

The term CVT refers to a stepless transmission; the letters CVT stand for continuously variable transmission. To increase the transmission ratio range of a stepless transmission—its gear ratio spread—it is known from European published application EP 2 275 709 A1 to position a planetary gear set after the stepless transmission. The controllable planetary gear set enables two-range shifting and shifting into reverse. In addition, it is known from German published unexamined application DE 102 61 900 A1 to provide a multi-range CVT with fixed engageable gears, for example for moving off or for top speed; however, when these fixed transmission ratios are in operation, the variator is uncoupled. Consequently there is only one stepless range; stepless operation is not possible in all driving ranges.

An object of the present invention is to simplify the operation of a CVT transmission having an input drive, a continuously variable variator, and a sub-transmission to achieve at least two operating ranges (low and high) having continuously variable gear ratios and having a direct-shift stage for switching between a first operating range (low) and a second operating range (high) with continuously variable gear ratios.

SUMMARY OF THE INVENTION

The above-stated object is fulfilled in a CVT transmission having an input drive, a continuously variable variator, and a sub-transmission to achieve at least two operating ranges (low and high) with continuously variable gear ratios and having a direct-shift stage for switching between a first operating range (low) and a second operating range (high) with continuously variable gear ratios. The sub-transmission for the first operating range (low) includes a non-positive clutch, in particular a friction clutch, and for the second operating range (high) a positive clutch, in particular a jaw clutch. Through the combination according to the present invention of the non-positive clutch for the first operating range (low) with the positive clutch for the second operating range (high), it is possible to save on costs in the production of the CVT transmission, because the positive clutch leads to fewer costs than a non-positive clutch. Nevertheless, surprisingly, the combination of the non-positive with the positive clutch can make relatively high comfort possible when operating the CVT transmission.

A preferred exemplary embodiment of the CVT transmission is characterized in that the direct-shift stage includes a positive clutch, in particular a jaw clutch. This enables the production costs to be reduced further, in fact without having to significantly reduce the driving comfort when operating the CVT transmission.

Another preferred exemplary embodiment of the CVT transmission is characterized in that the direct-shift stage which bridges the variator is connected directly to the input drive. The direct connection of the direct-shift stage to the input drive enables the direct-shift stage to be used advantageously independently of the start-up element. The direct-shaft stage can be connected, for example, to a gear that is used in conventional CVT drive trains to drive a hydraulic pump. Such a gear is therefore also referred to as a pump drive gear. If the input drive is a combustion machine or internal combustion engine, then the direct-shift stage that bridges the variator is driven directly by the combustion machine or internal combustion engine. Because of the direct connection of the direct-shift stage to the input drive, the direct-shaft stage is preferably used within the framework of the present invention exclusively in the driving operation of a motor vehicle equipped with the CVT drive train.

Another preferred exemplary embodiment of the CVT transmission is characterized in that the direct-shift stage that bridges the variator is connected to a crankshaft with an interposed torsional vibration damper. The torque of the input drive, in particular of the combustion machine or internal combustion engine, is delivered by means of the crankshaft. The torsional vibration damper serves to uncouple from the CVT drive train unwanted torsional vibrations that occur during operation of the input drive, in particular the combustion machine or internal combustion engine. That prevents unwanted damage to the CVT drive train caused by rotational non-uniformities.

Another preferred exemplary embodiment of the CVT transmission is characterized in that the sub-transmission is positioned between the variator and a differential. The sub-transmission is, for example, a step-down gear. The sub-transmission is preferably positioned between a variator output and the differential.

The direct-shift stage, on the other hand, is preferably positioned between the start-up element and a variator input.

Another preferred exemplary embodiment of the CVT transmission is characterized in that the sub-transmission is implemented as a dual-range transmission, in particular as a planetary transmission. The dual-range transmission makes driving operation possible, for example, in the first range, which is also referred to as the low range, and in the second range, which is also referred to as the high range. In the first range it is possible, for example, to drive with a higher transmission ratio than in the second range. Furthermore, the dual-range transmission in the form of a planetary transmission advantageously makes it possible to produce a reverse gear.

Another preferred exemplary embodiment of the CVT transmission is characterized in that the sub-transmission is implemented as a planetary transmission with a simple planetary gear set. According to an essential aspect of the present invention, the planetary transmission is constructed much more simply than conventional planetary transmissions, which include at least two planetary gear sets. When simplifying the planetary transmission, a loss of operating comfort or shifting comfort is consciously accepted. However, that leads to the advantage that the simplified planetary transmission is not only easier to manufacture, but also can be used much more flexibly, for example to achieve a sort of transmission construction set for different classes of torque. Furthermore, construction space can be saved by simplifying the planetary transmission.

A preferred embodiment of the CVT transmission is characterized in that the planetary transmission includes a sun gear, a ring gear, and planet gears that are rotatably supported on a planet carrier. In contrast to conventional planetary transmissions, the planetary transmission includes only one sun gear, only one ring gear, and only one planet carrier. Among other things, that provides the advantage that demands can be taken into account more easily and more flexibly when designing the planetary transmission.

Another preferred exemplary embodiment of the CVT transmission is characterized in that the sun gear is linked to a variator output. The sun gear of the planetary transmission is advantageously non-rotatably connected to an output shaft of an output-side conical disk set.

Another preferred exemplary embodiment of the CVT transmission is characterized in that the planetary transmission is positioned with the simple planetary gear set between the variator and the differential. In addition to the output-side conical disk set, the variator includes a drive-side conical disk set—that is connected in terms of propulsion to the input drive, for example a combustion machine or an internal combustion engine, with the start-up element interposed. The differential serves advantageously on the output side to distribute torque provided by the input drive, for example, to two driven vehicle wheels.

Another preferred exemplary embodiment of the CVT transmission is characterized in that a rotation reversing device is inserted after the planetary transmission with the simple planetary gear set to achieve a reverse gear. The rotation reversing device is intentionally not integrated into the planetary transmission, according to another aspect of the invention. That further simplifies the production of the planetary transmission. Moreover, the intentional separation between planetary transmission and rotation reversing device further simplifies achieving the transmission construction set.

Another preferred exemplary embodiment of the CVT transmission is characterized in that the rotation reversing device is implemented as a fixed-stage transmission with a forward branch and a reverse branch. The fixed-stage transmission includes, for example, a spur gear stage and a claw shifter to switch between the forward branch and the reverse branch. Furthermore, the fixed-stage transmission advantageously enables a neutral position or idle position, in which no torque is transferred via the fixed-stage transmission.

The object stated above is fulfilled alternatively, or additionally, in a method for operating a CVT transmission having an input drive, a continuously variable variator, and a sub-transmission to achieve at least two operating ranges (low and high) with continuously variable gear ratios, and having a direct-shift stage for switching between a first operating range (low) and a second operating range (high) with continuously variable gear ratios, in particular a previously described CVT transmission. Switching from the first operating range (low) to the second operating range (high) occurs by means of the direct-shift stage. The switchover from the first operating range (low) to the second operating range (high) preferably always occurs by means of the direct-shift stage. The switchover from the first operating range (low) to the second operating range (high) preferably always occurs at the same transmission ratio, for example at a transmission ratio of about 4.25. In reference to a characteristic curve that includes the low range, the switchover from the first operating range (low) to the second operating range (high) by means of the direct-shift stage preferably occurs at the lower end of that characteristic curve.

The object stated above is fulfilled alternatively, or additionally, in a method for operating a CVT transmission having an input drive, a continuously variable variator, and a sub-transmission to achieve at least two operating ranges (low and high) with continuously variable gear ratios and having a direct-shift stage for switching between a first operating range (low) and a second operating range (high) with continuously variable gear ratios, in particular a previously described CVT transmission. Quick resets from the second operating range (high) to the first operating range (low) are carried out with the friction clutch of the sub-transmission slipping. That makes it possible to switch over quickly and easily from any given point in the second operating range (high) to the first operating range (low), for example to achieve a so-called kick-down, without using the direct-shift stage.

A preferred exemplary embodiment of the method is characterized in that a quick reset of the transmission ratio is carried out with the friction clutch of the sub-transmission slipping and simultaneous variator adjustment. That makes it possible to further improve the shifting comfort of the CVT transmission.

Another preferred exemplary embodiment of the method is characterized in that a quick reset of the transmission ratio is carried out with the friction clutch of the sub-transmission slipping and without variator adjustment. Depending on the operating mode, it can be advantageous to keep the variator ratio constant.

The object stated above is fulfilled alternatively, or additionally, in a method for operating a CVT transmission having an input drive, a continuously variable variator, and a sub-transmission to achieve at least two operating ranges (low and high) with continuously variable gear ratios and having a direct-shift stage for switching between a first operating range (low) and a second operating range (high) with continuously variable gear ratios, in particular a previously described CVT transmission. In a quick reset of the transmission ratio the system jumps directly from the second operating range (high) to the first operating range (low) without using the direct-shift stage. That makes it possible to accelerate the switchover.

BRIEF DESCRIPTION OF THE DRAWINGS

Additional advantages, features and details of the invention can be seen from the following description, in which various exemplary embodiments are described in detail with reference to the drawings. The drawing figures show the following.

DESCRIPTION OF THE PREFERRED EMBODIMENTS

Figure 1:
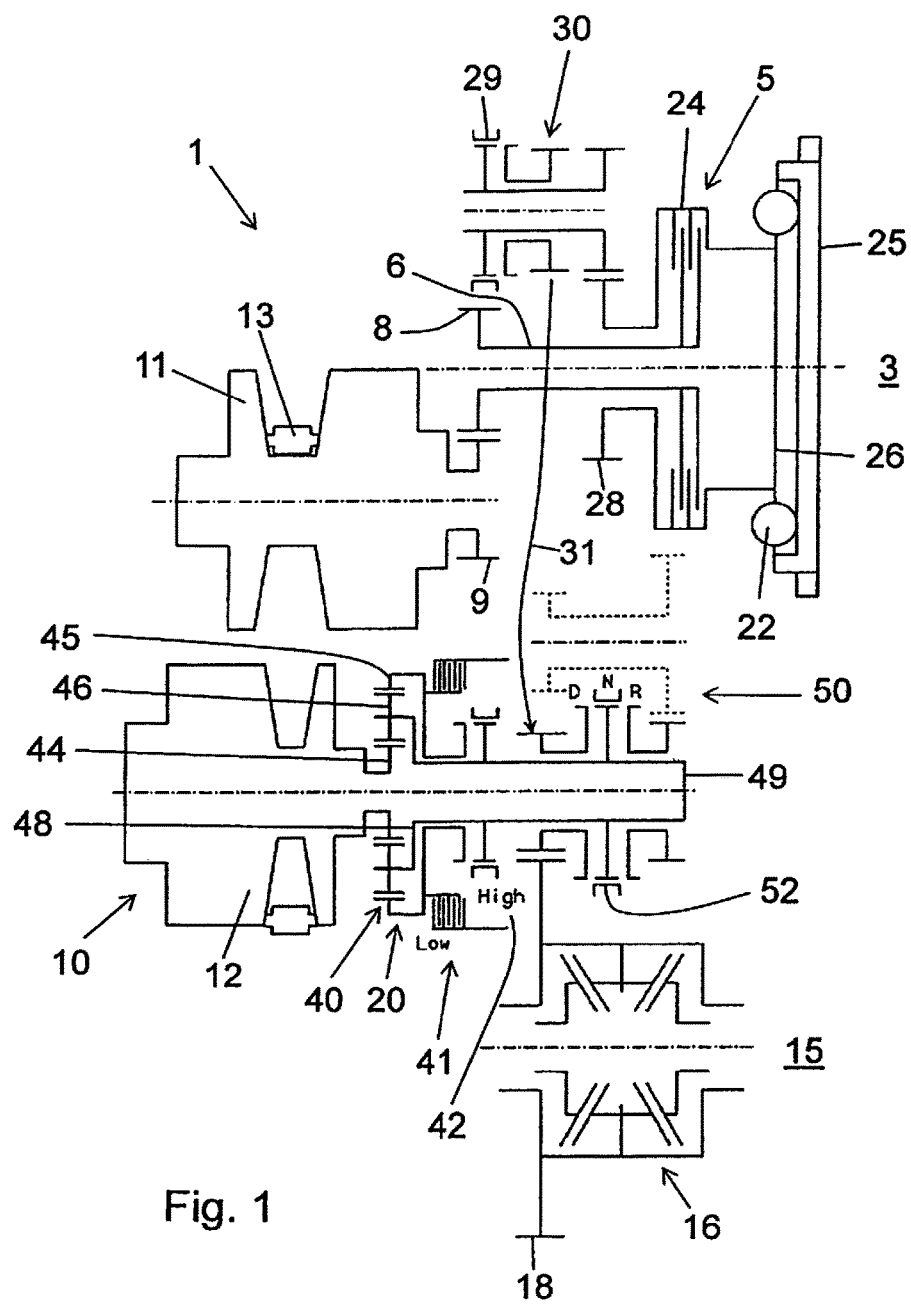
FIG. 1 is a simplified depiction representation of a CVT drive train according to the present invention in a longitudinal section.

FIG. 1 shows a CVT drive train 1 having a CVT transmission according to the present invention. The CVT drive train 1 includes an input drive 3. The input drive is, for example, a combustion machine, which is also referred to as an internal combustion engine when used in a motor vehicle. The CVT drive train 1 is used in motor vehicles.

A start-up element 5 makes it possible to move the motor vehicle off. A torque is forwarded from the input drive 3 to a start-up output part 6 through the start-up element 5. The start-up output part 6 is connected to a variator input of a variator 10 through a gear stage having a gear 8 and a gear 9.

The variator 10 includes a conical disk set 11 on the drive side and a conical disk set 12 on the output side. The two conical disk sets 11, 12 are coupled with each other by an endless torque-transmitting means 13, which is only shown generally. The endless torque-transmitting means 13 can be, for example, a special chain.

By means of the two conical disk sets 11 and 12, the transmission ratio between the input drive 3 and an output 15 can be varied continuously. The output 15 includes at least one driven wheel (not shown).

Normally, the output 15 is operatively connected to at least two driven vehicle wheels. An equalizing transmission, also referred to as a differential 16, serves to distribute the provided torque to the two driven vehicle wheels. The differential 16 includes a spur gear 18.

A planetary transmission 20 is positioned between the variator 10 and the differential 16. The planetary transmission 20 is operatively connected to a variator output on the output-side conical disk set 12.

A torsional vibration damper 22 is operatively connected to the input drive 3 of the CVT drive train 1. The torsional vibration damper 22 is positioned between the input drive 3 and the start-up element 5. The start-up element 5 is implemented as a starting clutch 24. The starting clutch 24 is a wet-running, multi-plate clutch.

An input part 25 of the torsional vibration damper 22 is non-rotatably connected to a crankshaft of the input drive 3. An output part 26 of the torsional vibration damper 22 represents, on the one hand, an input of the starting clutch 24. On the other hand, the output part 26 of the torsional vibration damper 22 is non-rotatably connected to a gear 28. The gear 28 serves, for example, to drive a pump (not shown). The gear 28 is therefore also referred to as a pump drive gear. However, the gear 28 can also serve to drive a different or an additional vehicle component.

According to one aspect of the present invention, a direct-shift stage 30 is operatively connected to the gear 28 and is switchable with the aid of a switching device 29. According to one aspect of the present invention, the switching device 29 is implemented as a jaw clutch. An arrow 31 indicates that the direct-shift stage 30 serves to bridge the variator 10. As also indicated by the arrow 31, with the aid of the switching device 29 the direct-shift stage can provide a direct coupling of the gear 28 to the spur gear 18 of the differential 16. With the aid of the direct-shift stage 30, the input drive 3 can be connected as a drive source through the torsional vibration damper 22, to the output 15, independently of the start-up element, past the variator, to the differential 16.

According to another aspect of the present invention, the planetary transmission 20 includes only a simple planetary gear set 40 and two switching stages 41, 42. The simple planetary gear set 40 includes a sun gear 44, which is non-rotatably connected to an output shaft of the output side conical disk set 12 of the variator 10. In addition, the simple planetary gear set 40 includes a ring gear 45. Planet gears 46 are meshed with the ring gear 45 and with the sun gear 44.

The planet gears 46 are rotatably supported on a planet carrier 48. The planet carrier 48 is non-rotatably connected to a transmission output shaft 49 of the planetary transmission 20.

The switching stage 41 is implemented as a multi-plate clutch to achieve a low range, and is operatively connected to the ring gear 45. The switching stage 42 is implemented as a jaw clutch and is operatively connected to the planet carrier 48, which is operatively connected to the transmission input shaft 49 and serves to achieve a high range.

A rotation reversing device 50 is connected downstream of the planetary transmission 20. The rotation reversing device 50 includes a gear stage that is non-rotatably connected to the transmission output shaft 49. By means of a jaw clutch 52 it is possible to switch between a neutral position N, a forward position D, and a reverse position R.

D stands for a forward driving mode, in which a torque supplied by the transmission output shaft 49 is transmitted via a forward branch of the rotation reversing device 50 to the spur gear 18 of the differential 16.

In reverse driving mode R, the torque supplied by the transmission output shaft 49 is transmitted to the spur gear 18 of the differential 16 in the direction of rotation opposite to the direction of rotation when in the forward driving mode.

In the neutral position N, the transmission output shaft 49 is decoupled from the spur gear 18 of the differential 16. Therefore, in the neutral position N, no torque is transmitted from the transmission output shaft 49 to the spur gear 18 of the differential 16.

The CVT transmission shown in FIG. 1 differs from conventional CVT transmissions in particular by including the two jaw clutches 42 and a jaw clutch included in switching device 29. Jaw clutch 42 serves in the sub-transmission 20 implemented as a planetary transmission to achieve the high range. On the other hand, the low range is achieved by a friction clutch 41. The jaw clutch included in switching device 29 is a part of the direct-shift stage 30.

Figure 2:
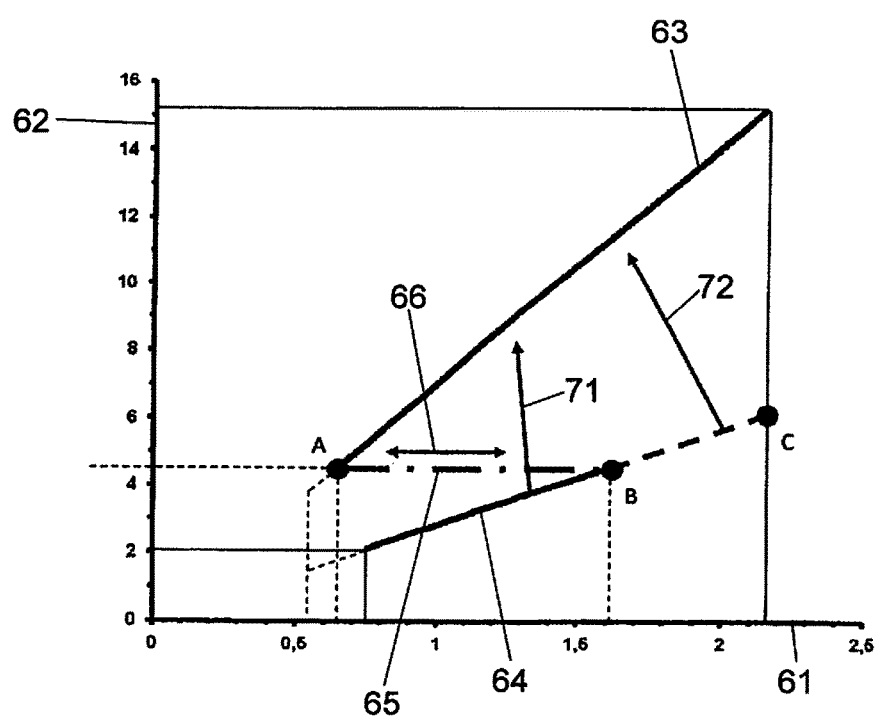
FIG. 2 is a transmission ratio characteristic map of the CVT drive train according to an exemplary embodiment of a method according to the present invention.

FIG. 2 shows a transmission ratio characteristic map for the CVT transmission shown in FIG. 1, in the form of a Cartesian coordinate diagram. The Cartesian coordinate diagram shown in FIG. 2 includes an x-axis 61 and a y-axis 62. A variator ratio of the variator (10 in FIG. 1) is plotted on the x-axis 61. A transmission ratio of the CVT transmission is plotted on the y-axis 62.

A characteristic curve 63 represents the low operating range. A characteristic curve 64 represents the high operating range. A dash-dotted line 65 that runs parallel to the x-axis 61 represents a switchover between the low range 63 and the high range 64. The switchover 65 takes place at a constant transmission ratio of, for example, about 4.5.

According to one aspect of the method according to the present invention, a switchover from the low range 63 to the high range 64 always occurs via the direct-shift stage 30 shown in FIG. 1[. The switchover through the direct-shift stage occurs, for example, from a point A along the dash-dotted switchover line 65 to a point B. Point A represents a lower end of the characteristic curve 63 for the low range. Point B represents an upper end of the characteristic curve 64 for the high range.

Quick resets from the high range 64 to the low range 63 can be carried out with a slipping clutch (clutch 41 shown in FIG. 1), as indicated in FIG. 2 by an arrow 71. Direct switches back from the high range 64 to the low range 63 can optionally also take place from a range between the switching point B and a switching point C, as indicated by an arrow 72 in FIG. 2. An arrow 66 in FIG. 2 shows that quick switchbacks or quick resets can also take place with a slipping low clutch (clutch 41 shown in FIG. 1) and a simultaneous variator adjustment.

What is claimed is:

1. A CVT transmission comprising:
   an input drive;
   a continuously variable variator; and
   a sub-transmission having a low operating range and a high operating range with continuously variable gear ratios;
   wherein the sub-transmission in the low operating range includes a friction clutch, and in the high operating range includes a jaw clutch.

2. A CVT transmission according to claim 1, further comprising a direct-shift stage, wherein the direct-shift stage bridges the variator and is operatively directly connected to the input drive.

3. A CVT transmission according to claim 2, wherein the direct-shift stage includes a jaw clutch.

4. A CVT transmission according to claim 1, wherein the sub-transmission is positioned between the variator and a differential.

5. A CVT transmission according to claim 1, wherein the sub-transmission is a planetary transmission having a planetary gear set including a sun gear, a ring gear, and planet gears meshed with the ring gear and the sun gear, wherein the planet gears are rotatably supported on a planet carrier that is configured to non-rotatably connect to a transmission output shaft.

6. The CVT transmission according to claim 5, wherein the friction clutch of the sub-transmission is operatively connected to the ring gear and the jaw clutch of the sub-transmission is operatively connected to the planet carrier.

7. A method for operating a CVT transmission having an input drive, a continuously variable variator, and a sub-transmission comprising:
   switching from a first operating range to a second operating range of the sub-transmission, wherein the first operating range is achieved using a friction clutch and the second operating range is achieved using a jaw clutch; and
   selectively coupling, via a direct-shift stage, the input drive to an output independently of a start-up element, wherein the direct-shift stage includes a jaw clutch.

8. A method according to claim 7, further comprising: performing quick resets from the second operating range to the first operating range utilizing the friction clutch of the sub-transmission in a slipping condition.

9. A method according to claim 7, further comprising: performing a quick reset of a transmission ratio utilizing the friction clutch of the sub-transmission in a slipping condition and simultaneously adjusting the variator.

10. A method according to claim 7, further comprising: performing a quick reset of a transmission ratio utilizing the friction clutch of the sub-transmission, and slipping the friction clutch without adjusting the variator.

11. A method according to claim 7, further comprising: performing a quick reset of a transmission ratio directly from the second operating range to the first operating range without using the direct-shift stage.

* * * * *